G. A. FARRALL & C. MAUL.
HARVESTER.
APPLICATION FILED DEC. 5, 1914.
1,181,127.
Patented May 2, 1916.
2 SHEETS—SHEET 1.
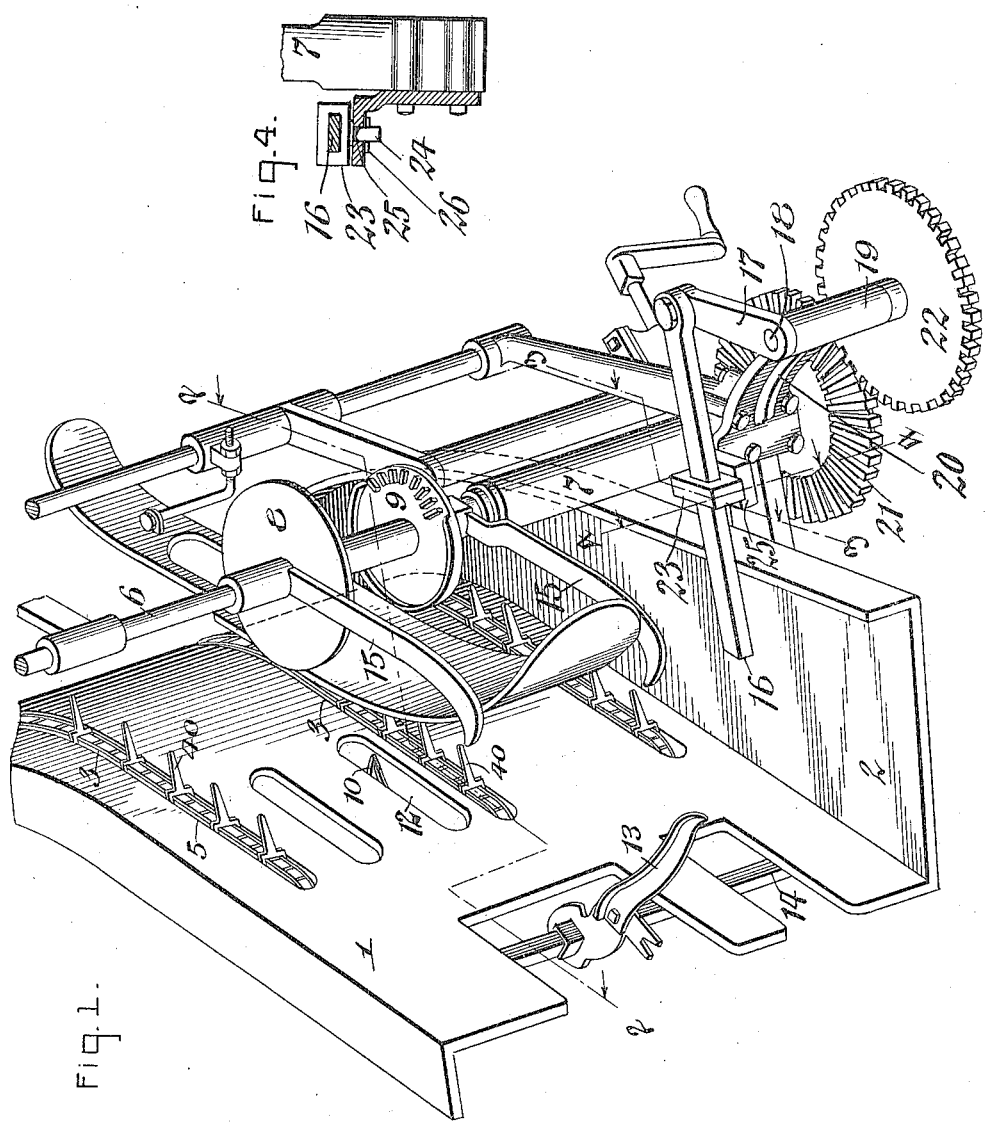
WITNESSES
W. Ray Taylor
Julius J. Pribble
INVENTORS
George A. Farrall
Christian Maul
by Geyer & Popp
ATTORNEYS

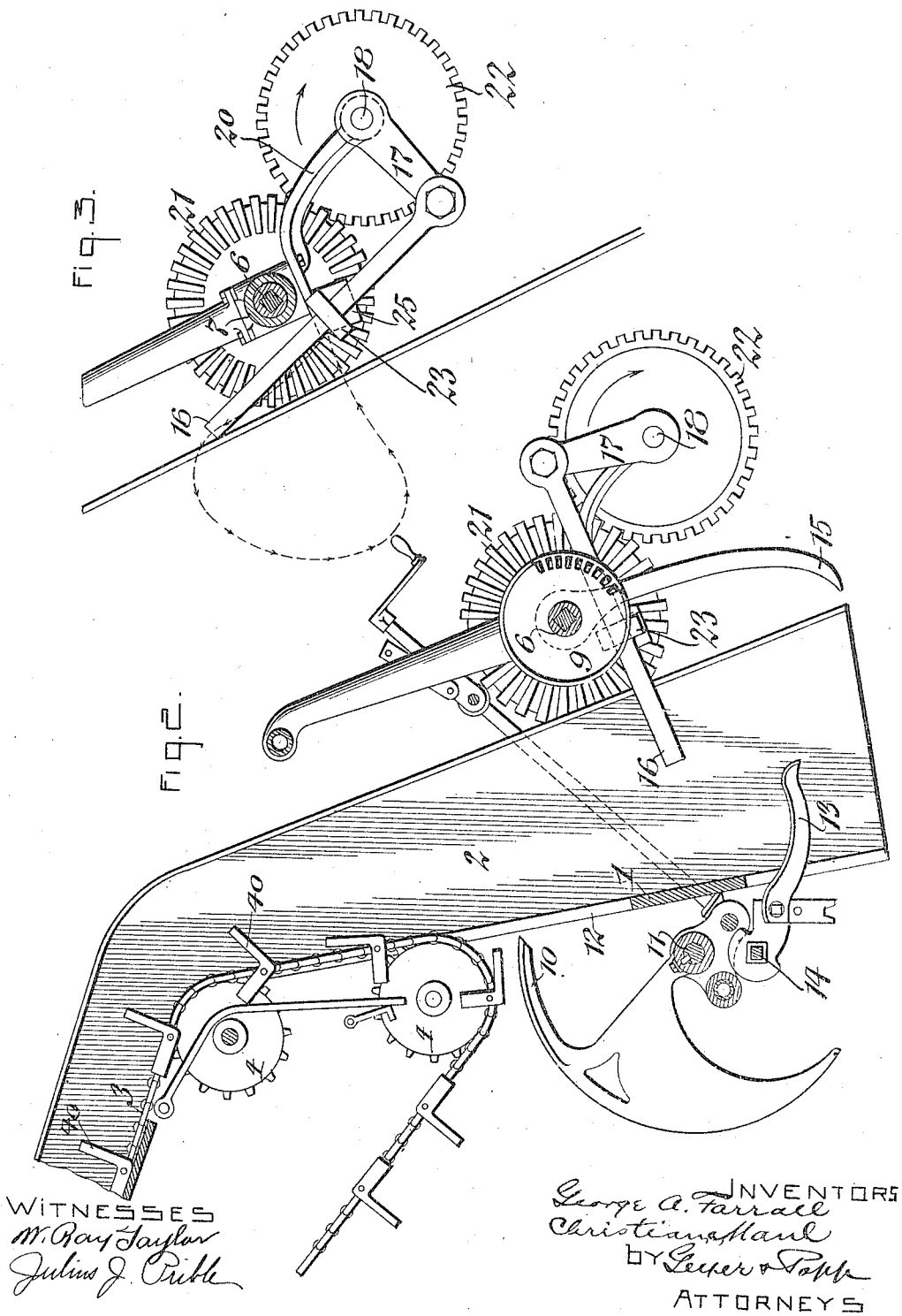

UNITED STATES PATENT OFFICE.

GEORGE A. FARRALL AND CHRISTIAN MAUL, OF BATAVIA, NEW YORK, ASSIGNORS TO THE JOHNSTON HARVESTER COMPANY, OF BATAVIA, NEW YORK, A CORPORATION OF NEW YORK.

HARVESTER.

1,181,127.   Specification of Letters Patent.   Patented May 2, 1916.

Application filed December 5, 1914.   Serial No. 875,632.

*To all whom it may concern:*

Be it known that we, GEORGE A. FARRALL and CHRISTIAN MAUL, citizens of the United States, residing at Batavia, in the county of Genesee and State of New York, have invented new and useful Improvements in Harvesters, of which the following is a specification.

This invention relates to a harvester which is more particularly designed for harvesting stalks of corn although the same may also be used for harvesting other kinds of stalks.

It has been found by actual experience that when harvesting certain kinds of stalks, for instance corn stalks which are in a straggling, matted or lodged condition, on the ground and also corn of which the stalks are comparatively short, that the lower or butt ends of the bundles of such stalks are liable to trail or drag over the bottom of the stalk guide while being carried in an upright position to the tying mechanism and while being ejected therefrom in the form of tied bundles. This in time is liable to produce a congestion or clogging of the bundles adjacent to the tying mechanism and necessitate stopping of the machine and clearing out the bundles which clog the path of the stalks before the machine can proceed wtih the further tying of the bundles in a satisfactory manner. This clogging is due to the fact that the lower or butt ends of the bundles of stalks are usually more solid and rest heavily on the bottom of the stalk guide by reason of the frictional engagement therewith of the butt ends of the stalks while the upper parts of the bundles are somewhat thinner, lighter and less dense. This permits the upper parts of the bundles to be pushed forwardly more effectively by the carrying and ejecting devices engaging with the upper parts of the bundles, leaving the lower or butt ends of the same lagging behind, if no provision is made to prevent it.

It is the object of this invention to provide simple, efficient and durable means whereby the butt ends of the bundles are caused to be ejected in unison with the upper parts thereof and thereby not only prevent clogging of the machine but also cause the butt ends of the bundles upon leaving the harvesting machine to have a more even base or bearing surface, so that the bundles can stand better on their butt ends and permit of sticking the same in groups or shocks.

In the accompanying drawings: Figure 1 is a fragmentary perspective view of a corn harvester equipped with our improved bundle ejecting mechanism. Fig. 2 is a horizontal section of the same taken substantially in line 2—2, Fig. 1. Fig. 3 is a similar view taken substantially in line 3—3, Fig. 1. Fig. 4 is a fragmentary vertical section taken in line 4—4, Fig. 1.

Similar characters of reference indicate corresponding parts throughout the several views.

Although our improved bundle ejecting mechanism is applicable to harvesters which may vary as to details of construction that shown in the drawings is similar to those shown in Letters Patent of the United States #657,215 and #657,651 granted, respectively, September 4, 1900, and September 11, 1900, to The Johnston Harvester Co. The essential parts of this harvester with which our improvements coöperate and which are shown in the drawings comprise a guideway which extends from the stalk cutting mechanism arranged at the front end of the machine to the bundle tying mechanism at the rear end of the machine and which comprises a substantially vertical platform 1 and a substantially horizontal bottom 2 arranged at the lower end of the platform. The stalks after being cut are carried rearwardly from this cutting mechanism to the tying mechanism by a propelling mechanism which preferably comprises a plurality of carrying belts 3 passing around suitable supporting wheels 4 and having carrying wings or fingers 40 which move rearwardly on the operative stretches of these belts through slots 5 in the platform and in engagement with the stalks resting with their sides against the platform and with the butt ends resting on the bottom of the guideway. The tying mechanism is arranged in rear of this propelling mechanism and comprises an upright intermittently rotating knotter shaft 6 journaled in a suitable bearing 7 on the outer side of the path of the stalks and provided on its upper part with a knotter mechanism which is represented by the cams 8, 9 secured to this shaft so as to turn therewith. On the opposite side of the path of the stalks is arranged the needle 10 of the tying mechanism which is mounted on an upright rock shaft 11 arranged behind the platform and adapted to be rocked periodically for causing the point of the needle to pass back and forth through a slot 12 in the platform so as to draw a band of twine around the bundle and coöperate with the knotter mechanism for tying the ends of the band preparatory to discharging the same laterally from the machine. The knotter shaft is turned intermittently one complete rotation at a time by a mechanism which is of well known construction and which is controlled in the usual and well known manner by means of a trip arm 13 mounted on an upright rock shaft 14 arranged behind the platform and projecting normally into the path of the stalks so that the pressure of the latter against this trip arm causes the deflection of this arm and sets the bundle tying mechanism in motion. After each tying operation the knotter mechanism comes to rest and the needle is in its retracted position to permit the next following stalks to advance into a position to be tied into a bundle.

Heretofore the bundles have usually been discharged from the guideway after the bands were secured around the same by means of one or more ejector arms 15, 15 mounted on the upper part of the knotter shaft, so that during each rotation of the latter these ejector arms would sweep forwardly through the path of the bundles and deliver the same from the tail end of the guideway formed by the platform and the bottom thereof. These ejector arms are arranged a considerable distance from the bottom of the guideway so that only the thinner or lighter parts of the bundle adjacent to the central and upper ends thereof were engaged by these arms, thereby causing the lower or butt ends of the stalks resting upon the bottom to drag or lag behind more or less owing to the frictional engagement of these ends with the bottom. As the result of this action the lower or butt ends of the bundles are uneven or frayed and frequently clog the machine by reason of a succeeding bundle resting upon the frayed part at the butt end of a preceding bundle which is about to be discharged.

Our improved ejecting mechanism is designed to cause the butt ends of the bundles to be discharged in unison with the upper ends or parts of the bundles so as to reduce the straggling or frayed formation of the butt ends of the same and possible clogging of the machine. In its preferred form our improved ejecting mechanism, as shown in the drawings, is constructed as follows: 16 represents an ejector bar arranged adjacent to the lower part of the path of the stalks and on the same side thereof as the knotter shaft and adapted to sweep with its inner or front end rearwardly through the path of the stalks during its operative or rearward stroke and forwardly on one side of this path during its inoperative or return stroke. At its rear or outer end this ejector bar is pivoted on the outer end of a horizontally rotatable crank 17 which latter is mounted on the upper end of an intermittently rotatable ejector shaft 18 journaled in an upright position in a relatively stationary bearing 19. The latter is arranged on the outer end of a bracket 20 which is mounted on the adjacent standard of the main frame which also carries the bearing in which the knotter shaft is mounted. A rotary movement is imparted to the ejector shaft from the knotter shaft, by means of intermeshing gear wheels 21, 22 secured respectively to the lower ends of the knotter shaft and the ejector shaft. These gear wheels are of the same diameter so that during each rotation of the knotter shaft, which corresponds to one tying operation of the machine, the ejector shaft is also turned one complete rotation for causing the ejector bar to perform one ejecting operation. Between its front and rear ends the ejector bar is pivotally and slidably supported by means of a guide 23 which preferably has the form of a rectangular sleeve in which the ejector bar slides lengthwise, this sleeve being pivoted so as to be capable of rocking in a substantially horizontal plane by means of a pin 24 projecting downwardly from the underside of this sleeve and journaled in a bearing 25 formed on the bracket 20 adjacent to the bearing in which the knotter shaft is journaled. The guide sleeve 23 rests upon the bearing 25 and the same is confined thereon by a cotter pin 26 passing through the lower end of the pivot pin 24 and adapted to engage with the underside of said bearing 25, as shown in Fig. 4. At the end of each bundle tying and discharging operation the tying and ejecting mechanism comes to rest preparatory to gathering the stalks for the next bundle and while these mechanisms are at rest the upper ejector arms project rearwardly from the knotter shaft and substantially parallel with the path of the stalks, and the front end of the ejector bar is arranged at the rearward extremity of its ejecting movement but still projects across the path of the bundles, as shown in Figs. 1 and 2. When the trip arm 13 is next shifted by the pressure of the following stalks which are piled up against the same by the propelling mechanism, the tying and ejecting mechanisms are set in motion so that the ejector shaft rotates in the direction of the arrow in Figs. 2 and 3 and causes the ejector bar to first withdraw from the path of the stalks and then move forwardly relatively to the stalks outside of the path of the same, as shown in Fig. 3. During the continued rotation of the ejector shaft in this direction the free or front end of the ejector bar is moved across the path of the stalks in front of the bundle which has just been bound and then moves rearwardly relative to the stalk path in engagement with the lower end of the bundle in front of the same so that the latter is carried rearwardly over the bottom of the guideway and then comes to rest again in the position indicated in Figs. 1 and 2. The course of this movement of the free end of the ejector bar is diagrammatically indicated in Fig. 3 and it occurs at the same time that the upper ejector arms on the knotter shaft sweep rearwardly through the guideway in engagement with the front side of the upper parts of the tied bundle. By this means an ejector action is produced on the bundle throughout practically its entire height or length which is uniform in all parts and prevents the lower end of the bundle from lagging behind on the bottom of the guideway, so that the next following bundle cannot rest with its butt on this lagging portion of the bundle being ejected which otherwise would be liable to clog the machine. By thus ejecting the butt end of one bundle in unison with the upper parts thereof, the same is prevented from becoming frayed or brushed out into an uneven condition and instead is left in a practically even or square condition which permits of readily stacking the same on the ground with other bundles to form a shock on the field.

We claim as our invention:

1. A harvester comprising a tying mechanism adapted to secure bands around the bundles of stalks, a propelling mechanism for carrying the stalks to said tying mechanism, and means for discharging the tied bundles from said tying mechanism, comprising an ejector bar movable with its front end rearwardly in the path of the bundles and forwardly on one side of said path, a crank on which the rear end of said bar is mounted, and having means co-acting with said bar to cause its front end to move forwardly and rearwardly when its rear end is actuated by the crank.

2. A harvester comprising a tying mechanism adapted to secure bands around the bundles of stalks, a propelling mechanism for carrying the stalks to said tying mechanism, and means for discharging the tied bundles from said tying mechanism comprising an ejector bar movable with its front end rearwardly in the path of the bundles and forwardly on one side of said path, a crank on which the rear end of said bar is mounted and a guide on which said bar is mounted between its front and rear ends.

3. A harvester comprising a tying mechanism adapted to secure bands around the bundles of stalks, a propelling mechanism for carrying the stalks to said tying mechanism, and means for discharging the tied bundles from said tying mechanism comprising an ejector bar movable with its front end rearwardly in the path of the bundles and forwardly on one side of said path, a rotatable crank on which the rear end of said bar is pivoted, and a guide which is pivoted on a relatively stationary support and which is slidably engaged by said bar between the front and rear ends thereof.

4. A harvester comprising a tying mechanism adapted to secure bands around the bundles of stalks, a propelling mechanism for carrying the stalks to said tying mechanism, and means for discharging the tied bundles from said tying mechanism comprising an ejector bar movable with its front end rearwardly in the path of the bundles and forwardly on one side of said path, a rotatable crank on which the rear end of said bar is pivoted, a guide which is pivoted on a relatively stationary support and which is slidably engaged by said bar between the front and rear ends thereof and an intermittently rotating ejector shaft which is journaled in a relatively stationary bearing and on which said crank is mounted.

5. A harvester comprising a tying mechanism adapted to secure a band around the bundles of stalks and having a knotter shaft, a propelling mechanism adapted to carry the stalks to said tying mechanism, and means for discharging the tied bundles from said tying mechanism comprising an ejector bar engaging its front end with the bundles, a rotatable crank on which the rear end of said bar is mounted, an ejector shaft on which the crank is mounted, and intermeshing gear wheels mounted, respectively, on the knotter shaft and the ejector shaft.

6. A harvester comprising a tying mechanism adapted to secure a band around the bundles of stalks and having a knotter shaft, a propelling mechanism adapted to carry the stalks to said tying mechanism, and means for discharging the tied bundles from said tying mechanism comprising an ejector bar engaging its front end with the bundles, a rotatable crank on which the rear end of said bar is mounted, an ejector shaft on which the crank is mounted, intermeshing gear wheels mounted, respectively, on the knotter shaft and the ejector shaft and ejector arms arranged on the knotter shaft and engaging with the tied bundles.

Witness our hands this 3rd day of December, 1914.

G. A. FARRALL.
CHRISTIAN MAUL.

Witnesses:
 Lewis D. Collins,
 Guy E. Lown.

Copies of this patent may be obtained for five cents each, by addressing the "Commissioner of Patents, Washington, D. C."